UNITED STATES PATENT OFFICE.

FRED. HOFFMANN AND ROBERT WENDLER, OF BROOKLYN, NEW YORK.

IMPROVED DISINFECTING COMPOSITION.

Specification forming part of Letters Patent No. 54,907, dated May 22, 1866.

*To all whom it may concern:*

Be it known that we, FRED. HOFFMANN and ROBERT WENDLER, of the city of Brooklyn, in the county of Kings, State of New York, have invented a new and Improved Disinfecting Composition; and we do hereby declare that the following is a full, clear, and exact description thereof, which will enable others skilled in the art to make and use the same.

This invention relates to a compound the principal ingredients of which are charcoal and hydrated oxide of phenyl or carbolic acid, to which may be added burned lime and hypochloric acid in any suitable form and proportion.

In preparing our compound we take animal or vegetable coal which has been previously reduced to its most effective absorbent state by proper chemical treatment and by heating in an atmosphere of carbonic oxide or carbonic acid. With this charcoal we mix hydrated oxide of phenyl in all its states, from the crude tar-oil to the purest form in which it can be obtained, and under whatever name it may pass—as, for instance, carbolic acid, phenyl, creosote, &c.—or its corresponding chemical substitutes or equivalents—that is to say, salts or compounds containing such hydrated oxide of phenyl—and of such a nature that said material disengages itself therefrom under the proper circumstances. To these substances we add burned lime and hypochloric acid fixed to the bases of alkalies or alkaline earths, and, if desired, any indifferent vegetable cellulose, such as saw-dust, may be added.

By these means a mixture is obtained which is a powerful disinfectant, and which can be used with great advantage in the public streets and places of a city, and also in dwelling-houses, hospitals, &c. By its use the noxious gases are absorbed, and the danger of epidemic diseases is materially reduced.

What we claim as new, and desire to secure by Letters Patent, is—

1. A disinfecting compound made of charcoal and hydrated oxide of phenyl, substantially as described.

2. A disinfecting compound of charcoal, hydrated oxide of phenyl, and burned lime, as described.

3. A disinfecting compound made of charcoal, hydrated oxide of phenyl, burned lime, and hypochloric acid, with or without the addition of an indifferent vegetable cellulose, as specified.

The above specification of our invention signed by us this 27th day of March, 1866.

DR. FREDERICK HOFFMANN.
ROBERT WENDLER.

Witnesses:
WM. F. MCNAMARA,
ALEX. F. ROBERTS.